(12) United States Patent
Bang

(10) Patent No.: US 9,657,871 B2
(45) Date of Patent: May 23, 2017

(54) HIGH PRESSURE HOSE

(71) Applicant: AeKyung Bang, Seongnam-si (KR)

(72) Inventor: AeKyung Bang, Seongnam-si (KR)

( * ) Notice: Subject to any disclaimer, the term of this patent is extended or adjusted under 35 U.S.C. 154(b) by 167 days.

(21) Appl. No.: 14/654,206

(22) PCT Filed: Jan. 9, 2015

(86) PCT No.: PCT/KR2015/000245
§ 371 (c)(1),
(2) Date: Jun. 19, 2015

(87) PCT Pub. No.: WO2015/105380
PCT Pub. Date: Jul. 16, 2015

(65) Prior Publication Data
US 2016/0258557 A1 Sep. 8, 2016

(30) Foreign Application Priority Data

Jan. 9, 2014 (KR) .................. 10-2014-0003009

(51) Int. Cl.
*F16L 11/08* (2006.01)
*F16L 11/10* (2006.01)
*F16L 11/24* (2006.01)
*F16L 11/112* (2006.01)

(52) U.S. Cl.
CPC ............. *F16L 11/10* (2013.01); *F16L 11/112* (2013.01); *F16L 11/24* (2013.01)

(58) Field of Classification Search
CPC ...... F16L 11/112; F16L 11/1185; F16L 11/24; F16L 11/085; F16L 11/083; F16L 11/088

USPC ........ 138/121–127, 129, 130, 173, 144, 145
See application file for complete search history.

(56) References Cited

U.S. PATENT DOCUMENTS

| | | | | |
|---|---|---|---|---|
| 3,073,353 A | * | 1/1963 | Rittenhouse | F16L 11/118 138/110 |
| 4,140,154 A | * | 2/1979 | Kanao | F16L 11/10 138/122 |
| 4,870,535 A | * | 9/1989 | Matsumoto | B65G 53/52 138/103 |
| 5,046,531 A | * | 9/1991 | Kanao | F16L 9/147 138/122 |
| 5,702,132 A | * | 12/1997 | Friederich | F16L 11/112 138/127 |
| 5,899,237 A | * | 5/1999 | Akedo | F16L 11/112 138/122 |

(Continued)

FOREIGN PATENT DOCUMENTS

KR  20-1982-0000588 Y1  4/1982
KR  10-0264748 B1  8/2000
(Continued)

*Primary Examiner* — Patrick F Brinson
(74) *Attorney, Agent, or Firm* — Rabin & Berdo, P.C.

(57) ABSTRACT

Provided is a high pressure hose having a new structure capable of withstanding a high pressure and being easy to use. The high pressure hose has an advantage in that it has a much higher strength than a conventional high pressure hose having one reinforcing layer while preventing the elasticity or the flexibility thereof from being decreased compared to high pressure hoses having several reinforcing layers constituted by weaving fibers, by forming the second reinforcing layer (40) constituted by winding the cable (41) around a circumferential surface of the first coating in a helical direction.

1 Claim, 9 Drawing Sheets

(56) References Cited

U.S. PATENT DOCUMENTS

| | | | | |
|---|---|---|---|---|
| 6,308,741 B1* | 10/2001 | Payne | ...................... | F16L 11/11 |
| | | | | 138/108 |
| 6,701,968 B2* | 3/2004 | Bolonhezi | .............. | F16L 11/112 |
| | | | | 138/122 |
| 6,827,109 B2* | 12/2004 | McCaughtry | .......... | F16L 11/112 |
| | | | | 138/122 |
| 7,516,762 B2* | 4/2009 | Colbachini | ............ | F16L 11/112 |
| | | | | 138/121 |
| 8,752,591 B2* | 6/2014 | Montalvo | .............. | F16L 11/082 |
| | | | | 138/121 |
| 2009/0211660 A1 | 8/2009 | Johnson et al. | | |
| 2009/0236004 A1* | 9/2009 | Jani | ....................... | F16L 11/083 |
| | | | | 138/127 |
| 2010/0071795 A1* | 3/2010 | Montalvo | .............. | F16L 11/112 |
| | | | | 138/126 |

FOREIGN PATENT DOCUMENTS

| | | |
|---|---|---|
| KR | 20-0375820 Y1 | 3/2005 |
| KR | 10-0655096 B1 | 12/2006 |
| KR | 10-1148595 B1 | 5/2012 |
| KR | 10-2013-0010917 A | 1/2013 |

* cited by examiner

HIGH PRESSURE HOSE

CROSS-REFERENCE TO RELATED APPLICATION

This application claims priority to and the benefit of Korean Patent Application No. 2014-0003009, filed on Jan. 9, 2014, the disclosure of which is incorporated herein by reference in its entirety.

BACKGROUND

1. Field of the Invention The present invention relates to a high pressure hose having a new structure capable of withstanding a high pressure and being easy to use.

2. Discussion of Related Art

Generally, as illustrated in FIG. 1, a high pressure hose used for transferring a high pressure gas or a liquid includes a hose main body 1 constituted of a flexible synthetic resin, a reinforcing layer 2 constituted by weaving high strength fibers to surround an outer surface of the hose main body 1, and a coating layer 3 stacked to surround an outer surface of the reinforcing layer 2, and is formed to prevent the hose main body 1 from being damaged by a high pressure gas or a liquid flowing through an inside of the hose main body 1.

Here, generally, the reinforcing layer 2 is constituted by weaving high strength organic fibers, that is, aramid fibers.

Since the structures of high pressure hoses are disclosed in detail in several prior documents such as Korea Patent No. 10-0264748, or Korea Patent No. 10-0655096, a detailed description is omitted.

Meanwhile, a high pressure hose capable of withstanding a much higher pressure than a conventional high pressure hose has become necessary recently.

Thus, in the above necessary high pressure hose, even though high pressure hoses having new structures in which the strength thereof is improved by several layers of the reinforcing layer 2 and the coating layer 3 being overlapped have been developed, there is a problem in which the high pressure hose is too stiff to be bent as the strength thereof is increased.

That is, since the reinforcing layer 2 is constituted by weaving aramid fibers, the elasticity or the flexibility thereof is decreased. Thus, there is a problem in which the elasticity or the flexibility of an entire high pressure hose is decreased when several layers of the reinforcing layer 2 are overlapped.

Thus, a new method to overcome this problem is needed.

SUMMARY OF THE INVENTION

The present invention is directed to a high pressure hose having a new structure configured to increase the strength thereof and prevent the elasticity or the flexibility thereof from being decreased.

According to an aspect of the present invention, there is provided a high pressure hose, including: a hose main body (10) formed of a flexible synthetic resin; a first reinforcing layer (20) constituted by weaving high strength fibers (21) to cover an outer surface of the hose main body (10); a first coating layer (30) stacked to cover an outer surface of the first reinforcing layer (20); a second reinforcing layer (40) constituted by winding a cable (41) around a circumferential surface of the first coating layer (30) in a helical direction; and a second coating layer (50) stacked to cover an outer surface of the second reinforcing layer (40).

The cable (41) may be constituted of two rows, and wound around the circumferential surface of the first coating layer (30) in a double-threaded screw manner.

The cable (41) included in the second reinforcing layer (40) may be formed of high strength aramid fibers.

The cable (41) may be formed of an excellent electrically conductive material.

The second coating layer (50) may be constituted by winding a synthetic resin strip (51) including a rigid core (52) formed of a high strength material at an outside surface thereof around a circumferential surface of the second reinforcing layer (40) in a helical direction.

The cable (41) of the second reinforcing layer (40) may include a first cable (41a) wound around the circumferential surface of the first coating layer (30) to form a helix in one direction, and a second cable (41b) wound around an outer circumferential surface of the first cable (41a) to form a helix in a direction opposite to the first cable (41a).

BRIEF DESCRIPTION OF THE DRAWINGS

The above and other objects, features and advantages of the present invention will become more apparent to those of ordinary skill in the art by describing in detail exemplary embodiments thereof with reference to the accompanying drawings, in which.

DETAILED DESCRIPTION OF EXEMPLARY EMBODIMENTS

Figure 1:
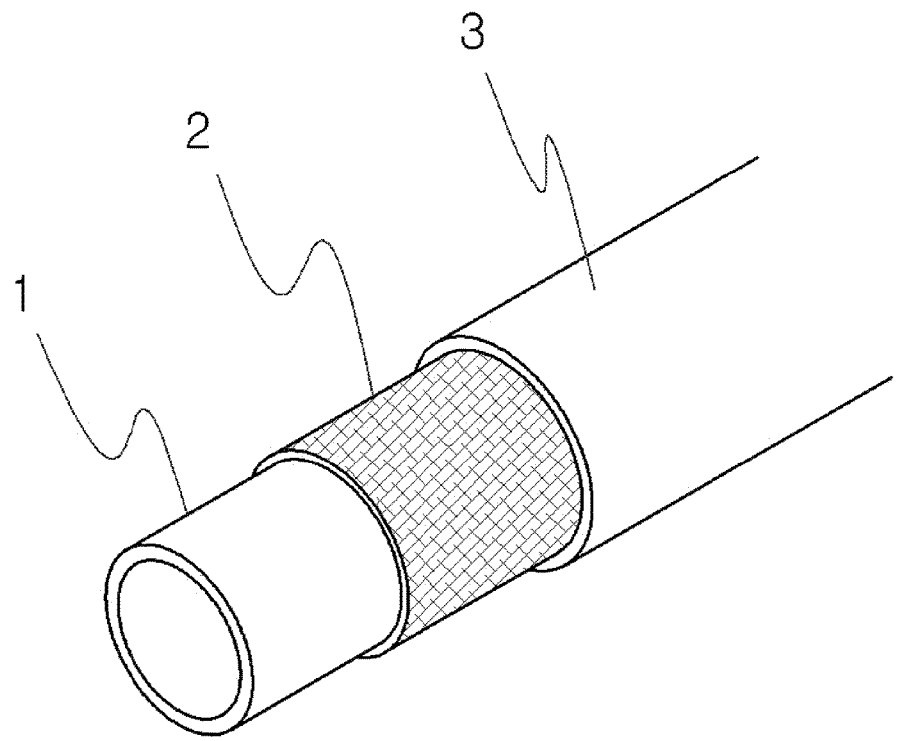
FIG. 1 is a reference view illustrating a configuration of a general high pressure hose.
Figure 2:
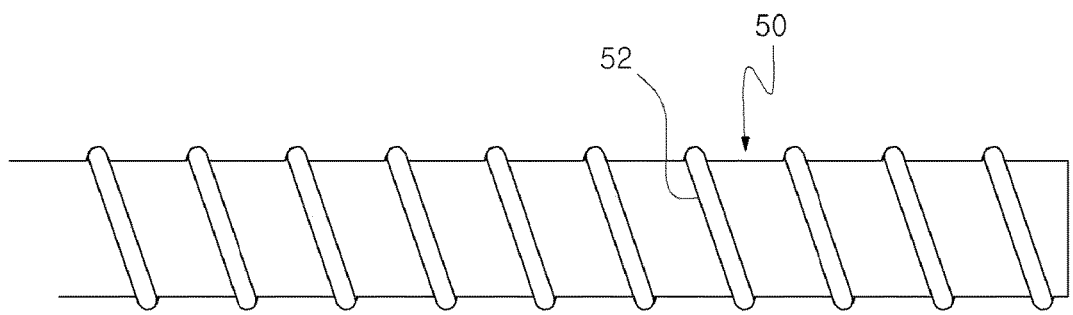
FIG. 2 is a side view illustrating a high pressure hose according to an embodiment of the present invention.
Figure 3:
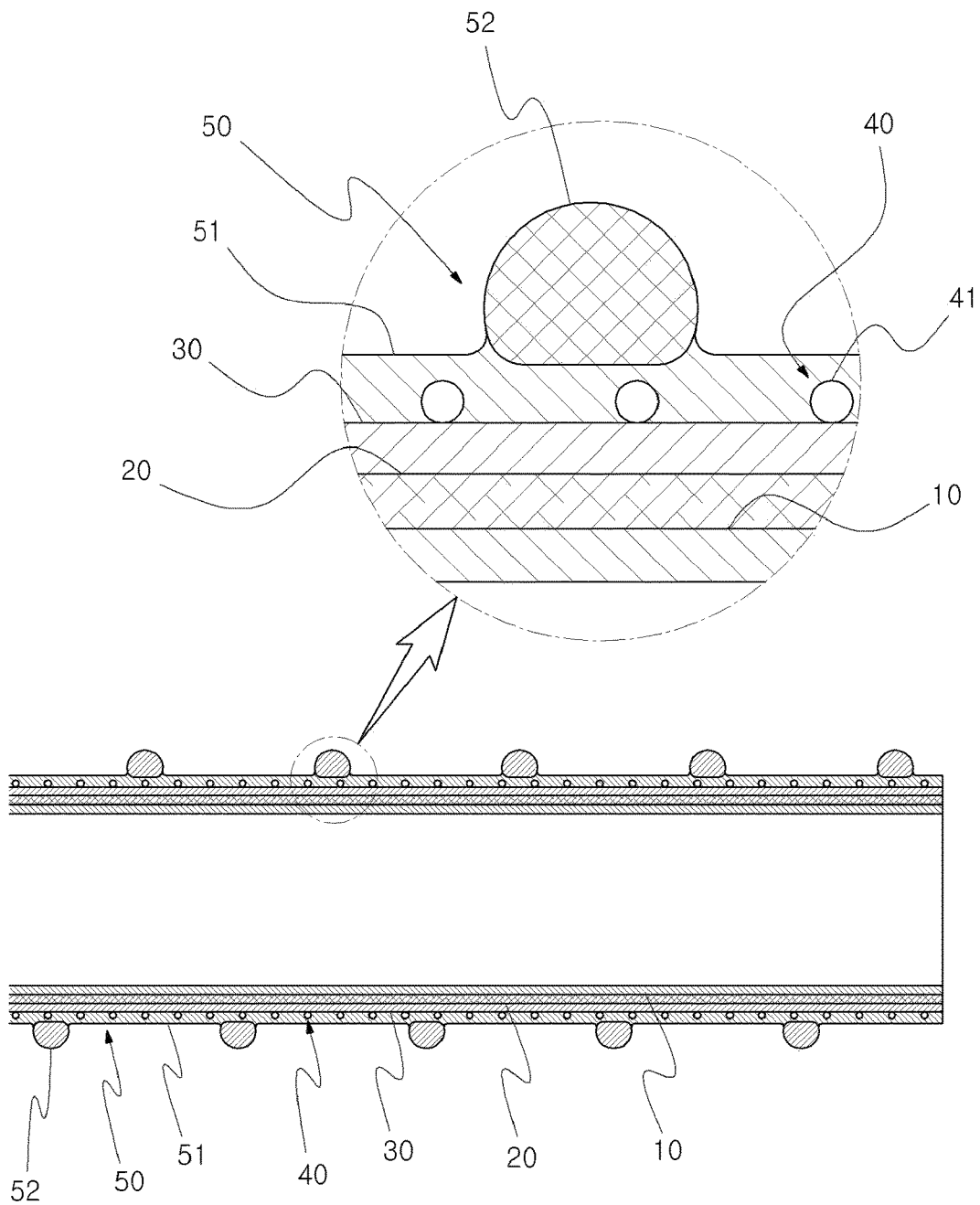
FIG. 3 is a side cross sectional view illustrating a high pressure hose according to an embodiment of the present invention.

Exemplary embodiments of the present invention will be described in detail below with reference to the accompanying drawings. While the present invention is shown and described in connection with exemplary embodiments thereof, it will be apparent to those skilled in the art that various modifications can be made without departing from the spirit and scope of the invention.

FIGS. 2 to 8 illustrate a high pressure hose according to an embodiment of the present invention. The high pressure hose includes a hose main body 10 formed of a flexible synthetic resin, a first reinforcing layer 20 constituted of woven high strength fibers 21 surrounding an outer surface of the hose main body 10, a first coating layer 30 stacked to cover an outer surface of the first reinforcing layer 20, a second reinforcing layer 40 constituted by winding a cable 41 around a circumferential surface of the first coating layer 30 in a helical direction, and a second coating layer 50 stacked to cover an outer surface of the second reinforcing layer 40.

Figure 4:
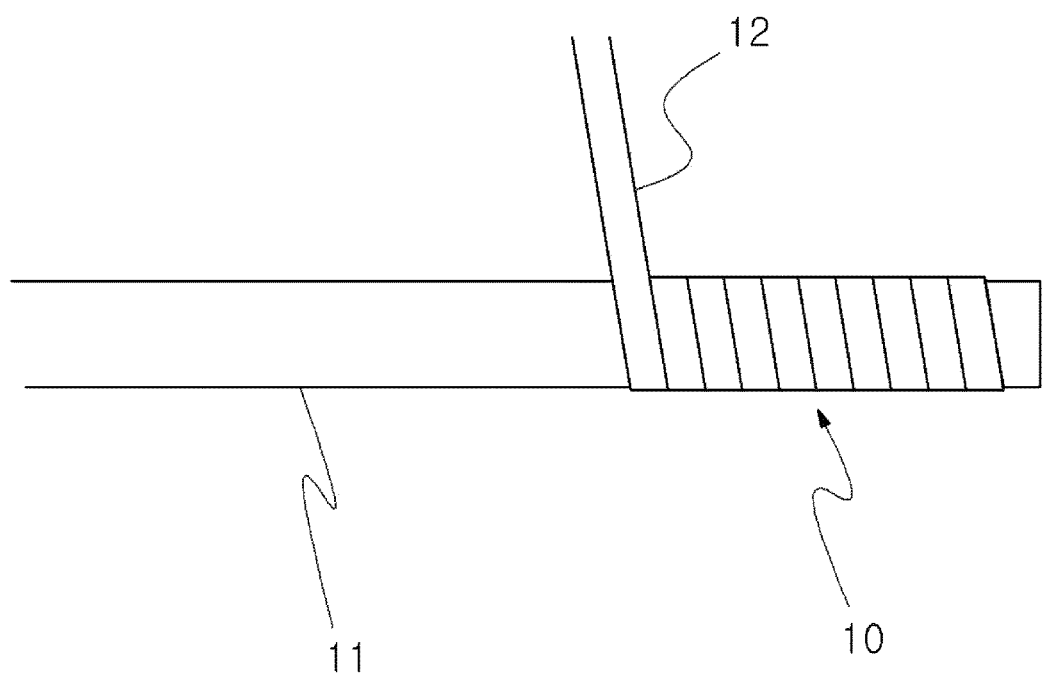
FIGS. 4 to 8 are reference views illustrating a method for manufacturing a high pressure hose according to an embodiment of the present invention.

As illustrated in FIG. 4, the hose main body 10 is manufactured by winding a synthetic resin strip 12 extruded by an extruder around a circumferential surface of a mold 11 having a rod shape in a helical direction, and curing.

Figure 5:
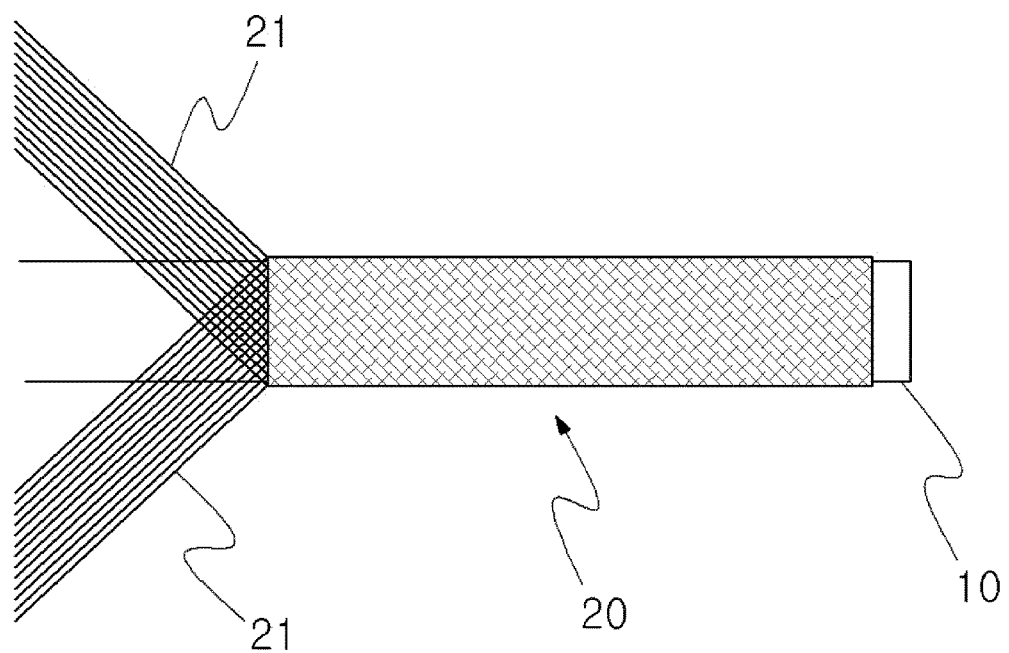

As illustrated in FIG. 5, the first reinforcing layer 20 is the woven high strength organic fibers 21, that is, aramid fibers to surround the outer surface of the hose main body 10.

Since a structure of the first reinforcing layer 20 is the same as a reinforcing layer included in a conventional high pressure hose, a more detailed description is omitted.

Figure 6:
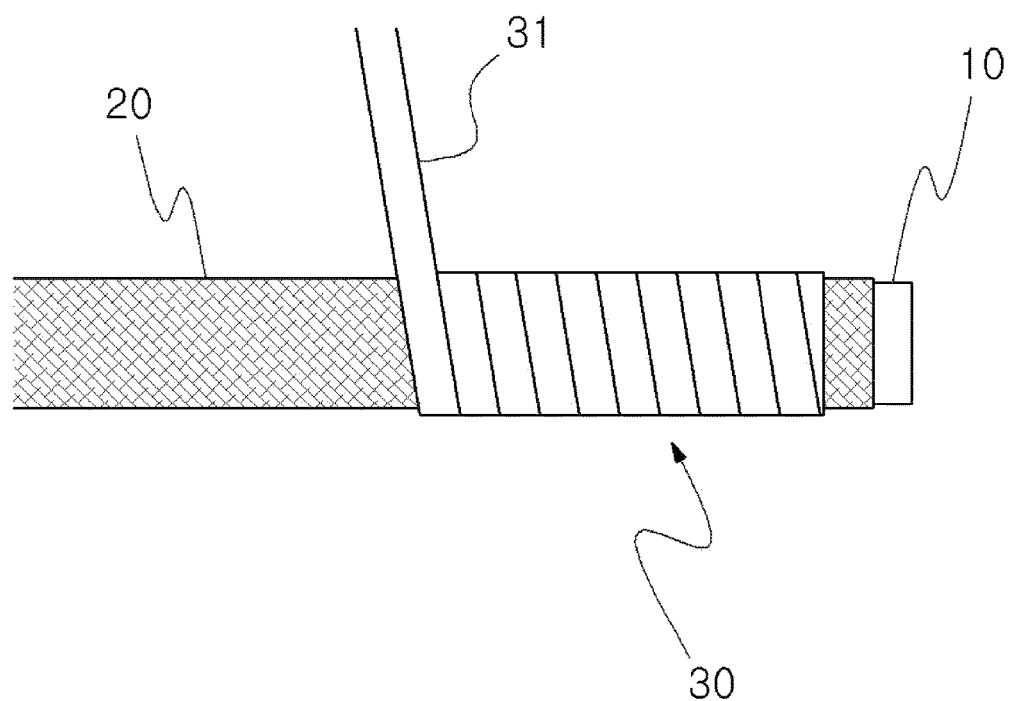

As illustrated in FIG. 6, the first coating layer 30 is manufactured by winding a side surface of a synthetic resin strip 31 extruded by an extruder around an outer surface of the first reinforcing layer 20 in a helical direction, and the side surface is adhered and fixed to completely cover the outer surface of the first reinforcing layer 20.

Figure 7:
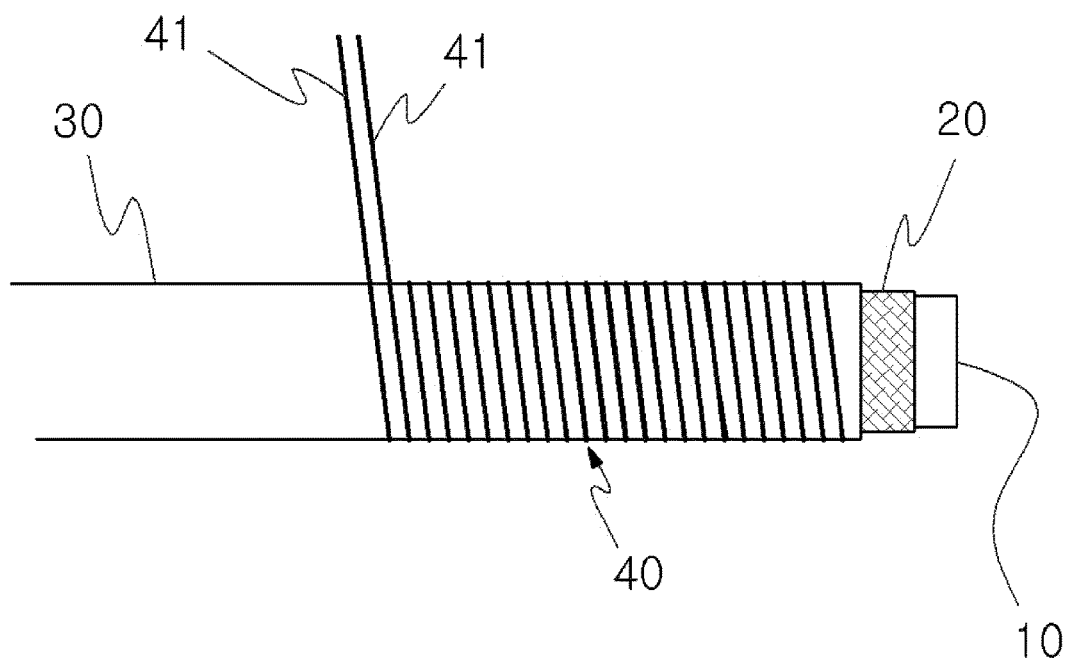

As illustrated in FIG. 7, the second reinforcing layer 40 is manufactured by winding the high strength cable 41, preferably constituted by the same organic fibers as those constituting the first reinforcing layer 20, that is, the aramid fiber cable 41 around a circumferential surface of the first reinforcing layer 20 to form a right-hand thread.

Here, the cable 41 is constituted of two rows, and wound around a circumferential surface of the first coating layer 30 in a double-threaded screw manner.

Figure 8:
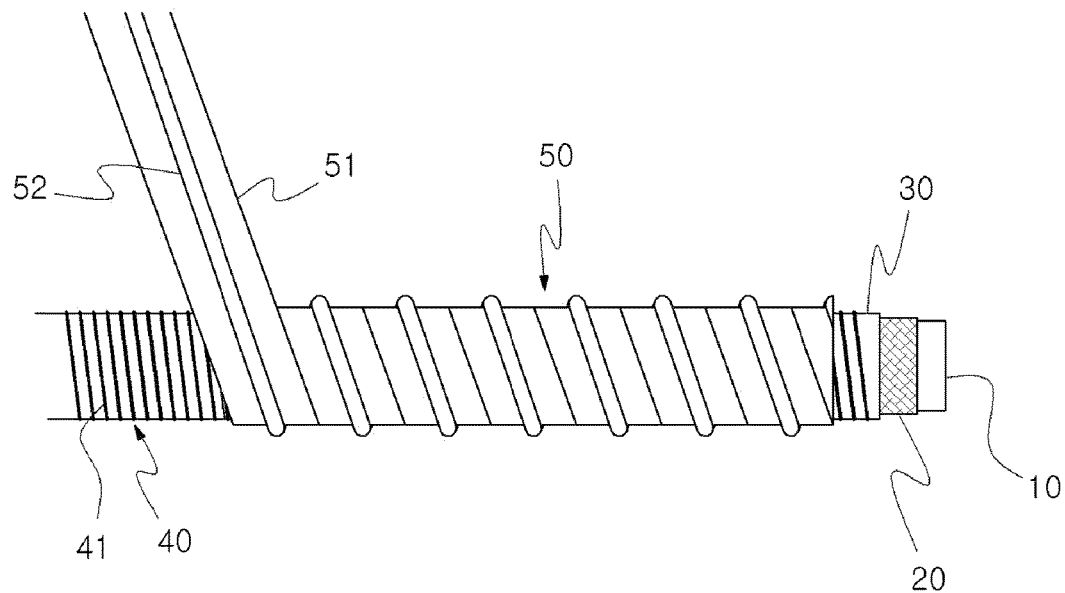

As illustrated in FIG. 8, the second coating layer 50 is constituted by winding a synthetic resin strip 51 including a rigid core 52 formed of a high strength material at an outside surface thereof around a circumferential surface of the second reinforcing layer 40 in a helical direction.

Here, the rigid core 52 is constituted of a metal or a synthetic resin having high strength and elasticity in a bar shape. When the rigid core 52 is extended in a lengthwise direction of the synthetic resin strip 51, and the synthetic resin strip 51 is wound around the circumferential surface of the second reinforcing layer 40, the synthetic resin strip 51 presses and strongly supports an outer surface of a second reinforcing layer 40 due to the rigid core 52.

Thus, as illustrated in FIGS. 4 to 8, the high pressure hose may be manufactured by sequentially covering the circumferential surface of the hose main body 10 with the first reinforcing layer 20, the first coating layer 30, the second reinforcing layer 40, and the second coating layer 50, and cutting it in a predetermined length.

The high pressure hose described above has an advantage in which it has a much higher strength than a conventional high pressure hose having one reinforcing layer while preventing the elasticity or the flexibility thereof from being decreased compared to a high pressure hose having several reinforcing layers constituted by weaving fibers, by forming the second reinforcing layer 40 constituted by winding the cable 41 around the circumferential surface of the first coating in a helical direction.

That is, since a conventional reinforcing layer is constituted by weaving high strength fibers in such a way they intersect each other, the conventional reinforcing layer may not deform to keep pace with the bending of the high pressure hose. Thus, there is a problem that an entire high pressure hose becomes stiff when the several reinforcing layers are overlapped.

However, in the present invention, since the cable 41 forming the second reinforcing layer 40 on the hose main body 10 winds around an outer surface of the first coating layer 30 in a helical manner, a decrease in the elasticity and flexibility of the high pressure hose as a result of hardening of the entire high pressure hose may be prevented by the second reinforcing layer 40 appropriately deforming when the high pressure hose is bent.

Here, since the second coating layer 50 is constituted by winding the synthetic resin strip 51 including the rigid core 52 constituted of a high strength material at an outside surface thereof around the circumferential surface of the second reinforcing layer 40 in a helical direction, there is an advantage that the strength of the high pressure hose is capable of being increased by the outer surface of the second reinforcing layer 40 being supported by the rigid core 52.

In the drawings of the present invention, even though the second reinforcing layer 40 constituted by winding the cable 41 in a right-hand thread manner is illustrated, the cable 41 may be wound in a left-hand thread manner.

Here, even though the cable 41 of the second reinforcing layer 40 is constituted of two rows, the cable 41 may be constituted of one row or three or more rows.

In addition, the cable 41 may be constituted of an excellent electrically conductive material, preferably copper.

Here, since the cable 41 is constituted of two rows, one row of the cable 41 may be constituted of copper and remaining one row of the cable 41 may be constituted of aramid fibers, or all the two rows of the cable 41 may be constituted of copper.

In the high pressure hose described above, since a ground wire is connected to the cable 41 constituted of copper, there is an advantage that changes in the material properties of a gas or a liquid, or an outbreak of fire may be prevented by electrostatic charges being grounded and removed through the second reinforcing layer 40, when electrostatic charges are generated at the high pressure hose by a gas or a liquid flowing inside of the high pressure hose.

Figure 9:
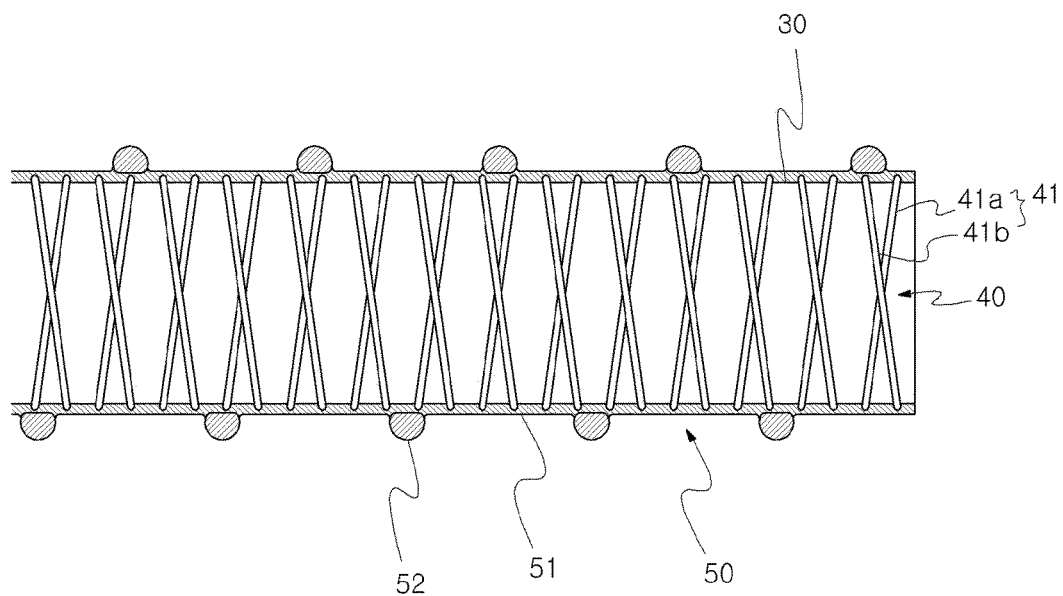
FIG. 9 is a side cross sectional view illustrating of a high pressure hose according to a second embodiment the present invention.
Figure 10:
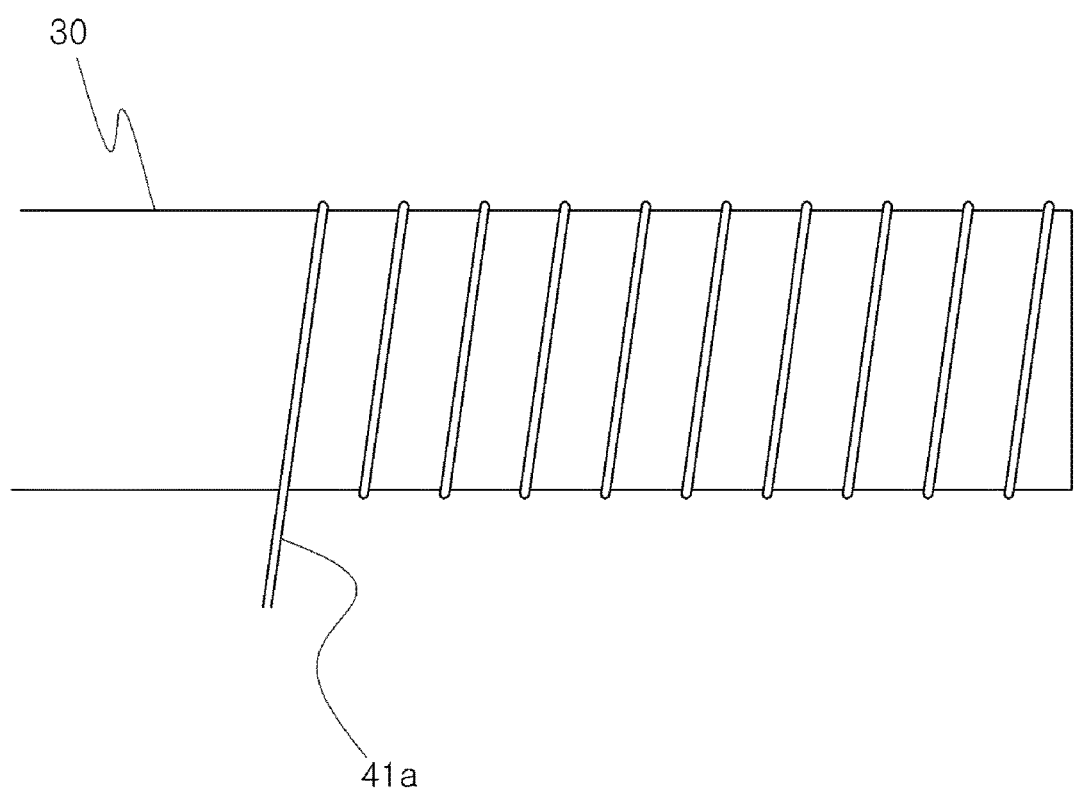
FIGS. 10 and 11 are reference views illustrating a method for manufacturing a high pressure hose according to a second embodiment of the present invention.
Figure 11:
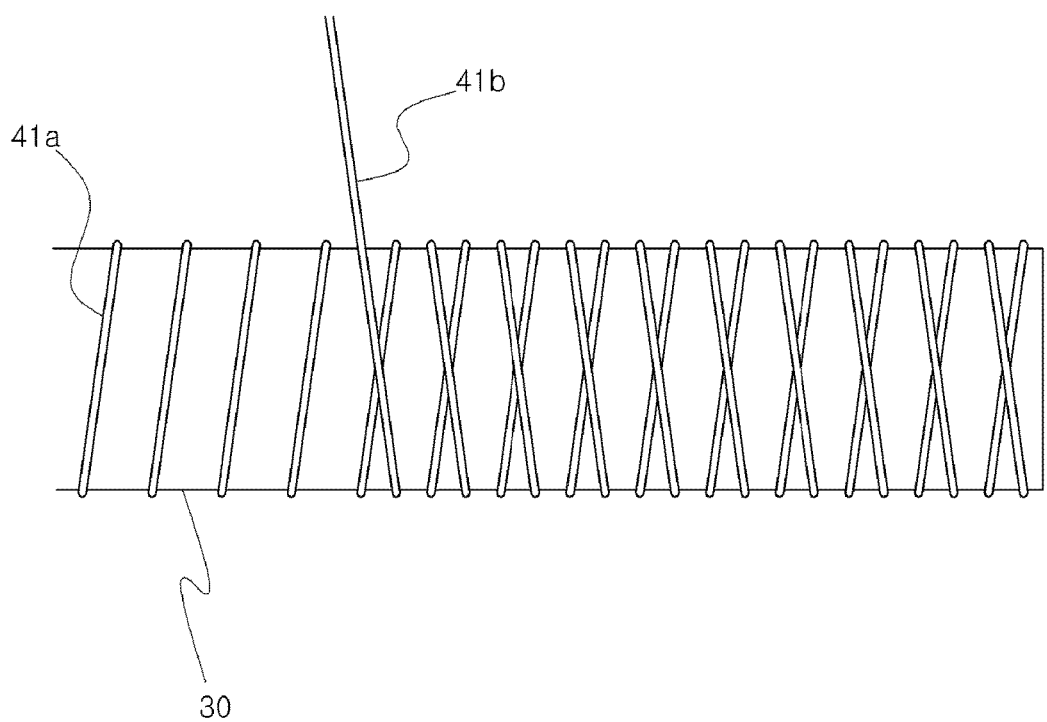

FIGS. 9 to 11 are views illustrating another embodiment of the present invention, according to another aspect of the present invention, the cable 41 of the second reinforcing layer 40 includes a first cable 41a wound around the circumferential surface of the first coating layer 30 to form a helix in one direction, a second cable 41b wound around the outer circumferential surface of the first cable 41a to form a helix in the direction opposite to the first cable 41a.

That is, the second reinforcing layer 40 is manufactured by winding the first cable 41a around the circumferential surface of the first coating layer 30 to form a helix in a right-hand thread direction as illustrated in FIG. 10, and winding the second cable 41b around the circumferential surface of the first coating layer 30 to form a helix in a left-hand thread direction as illustrated in FIG. 11.

Since the high pressure hose described above includes the first cable 41a in which the cable 41 of the second reinforcing layer 40 is wound around the circumferential surface of the first coating layer 30 to form a helix in one direction, and the second cable 41b wound around an outer circumferential surface of the first cable 41a to form a helix in the direction opposite to the first cable 41a, there is an advantage of a capability to prevent the high pressure hose from being bent by a gas or a liquid flowing through the inside of the high pressure hose.

That is, in the case of the embodiment described before, since the cable 41 is wound to form a helix only in one direction, a phenomena in which the high pressure hose is expanded and twisted in a helical direction of the cable 41 when the high pressure hose is pressurized by a gas or a liquid flowing through the high pressure hose may be generated.

However, in the embodiment of the present invention, since the second reinforcing layer 40 includes the first cable 41a and the second cable 41b wound to form helixes in directions opposite to each other, there is an advantage of a capability to prevent the high pressure hose from being twisted in a helical direction of the cable 41 by balancing forces of the first cable 41*a* and the second cable 41*b* when the high pressure hose is expanded by a gas and a liquid flowing through an inside of the high pressure hose.

The high pressure hose according to the present invention has an advantage in that it has a much higher strength than a conventional high pressure hose having one reinforcing layer while preventing the elasticity or the flexibility thereof from being decreased compared to high pressure hoses having several reinforcing layers constituted by weaving fibers, by forming the second reinforcing layer 40 constituted by winding the cable 41 around a circumferential surface of the first coating in a helical direction.

It will be apparent to those skilled in the art that various modifications can be made to the above-described exemplary embodiments of the present invention without departing from the spirit or scope of the invention. Thus, it is intended that the present invention covers all such modifications provided they come within the scope of the appended claims and their equivalents.

What is claimed is:

1. A high pressure hose, comprising:
   a hose main body (10) manufactured by winding a flexible synthetic resin strip (12) extruded by an extruder around a circumferential surface of a mold (11) having a rod shape in a helical direction and curing;
   a first reinforcing layer (20) constituted by weaving high strength fibers to cover an outer surface the hose main body (10);
   a first coating layer (30) adhered and fixed to cover an outer surface of the first reinforcing layer (20) by winding a synthetic resin strip (31) extruded by an extruder around an outer surface of the first reinforcing layer (20) in a helical direction;
   a second reinforcing layer (40) constituted by winding a cable (41) around a circumferential surface of the first coating layer (30) in a helical direction; and
   a second coating layer (50) stacked to cover an outer surface of the second reinforcing layer (40),
   wherein the cable (41) is constituted of two rows, and wound around the circumferential surface of the first coating layer (30) in a double-threaded screw manner in which threads are spaced apart from each other at predetermined intervals, one row of the cable (41) having two rows is constituted of excellent electrically conductive material and grounded, and remaining one row thereof is constituted of high strength aramid fibers,
   wherein the cable (41) of the second reinforcing layer (40) is constituted of a first cable (41*a*) wound around the circumferential surface of the first coating layer (30) to form a helix in one direction, and a second cable (41*b*) wound around an outer circumferential surface of the first cable (41*a*) to form a helix in a direction opposite to the first cable (41*a*), and is manufactured by winding the first cable (41*a*) around the circumferential surface of the first coating layer (30) to form a helix in a right-hand thread direction, and winding the second cable (41*b*) around the circumferential surface of the first coating layer (30) to form a helix in a left-hand thread direction, and the first cable (41*a*) and the second cable (41*b*) are wound to form helixes spaced apart from each other at predetermined intervals, and
   wherein the second coating layer (50) is constituted by winding a synthetic resin strip (51) including a rigid core (52) formed of a high strength material at an outside surface thereof around a circumferential surface of the second reinforcing layer (40) in a helical direction.

\* \* \* \* \*